United States Patent Office 3,652,761
Patented Mar. 28, 1972

3,652,761
IMMUNOCHEMICAL COMPOSITES AND ANTIGEN
OR ANTIBODY PURIFICATION THEREWITH
Howard H. Weetall, Elmira, N.Y., assignor to
Corning Glass Works, Corning, N.Y.
No Drawing. Filed Sept. 4, 1969, Ser. No. 855,376
Int. Cl. G01n 1/00, 1/34, 31/06
U.S. Cl. 424—12
27 Claims

ABSTRACT OF THE DISCLOSURE

This invention relates to the stabilization of antigens or antibodies by chemically coupling the antigens or antibodies to an inorganic carrier by means of an intermediate silane coupling agent whereby the antigens or antibodies become insolubilized.

The isolation and purification of antibodies are necessary steps in the study of antibody structure and synthesis. This is especially true where antibodies to specific antigens are concerned. Similarly, techniques which can be used to isolate and purify specific antibodies or antigens can also be employed for their detection and purification. This area has particular utility in the field of diagnostic medicine, analytical biochemistry, and related fields.

DESCRIPTION OF THE INVENTION

Basically there are two methods for the isolation and purification of antibodies. The physical methods involve the separation of groups of molecules based upon their physical properties such as molecular weight, isoelectric point, electrophoretic mobility and solubility in various solvent systems. Inherent in this approach is the fact that similar molecules regardless of immunological specificity will be isolated together. Then there are the immunological methods which depend upon a primary characteristic of all antibodies, i.e., their ability to react with specific antigen. Thus, if an antigen is added to a serum containing a specific antibody, the antigen and antibody will complex and precipitate from the solution:

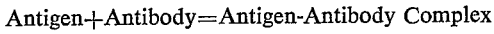

Antigen+Antibody=Antigen-Antibody Complex

Once separated, the antigen can be removed by enzymatic digestion, as in the case of carbohydrate antigens, or dissociation followed by physical separation if the two molecules are sufficiently different. The basic difficulty with the above separation technique is that, in general, complete separation of antigen from antibody is not achieved. Although purity can be increased above 50%, there is always some residual antigen left in the preparation.

Campbell, et al. Proc. Nat'l. Acad. Sci. (U.S.) 37, 575 (1951) found that by covalently coupling antigens to insoluble polymers before reacting with antibody in a serum sample, they were able to isolate and purify antibody which did not contain residual antigen.

Since these studies on immunoadsorbents, several types of polymers have been employed as carriers for antigens. These include cellulose and its derivatives, polyaminopolystyrene, dextrans, and polyaminoacids. Generally these materials are satisfactory, however, each has specific drawbacks. Some of the problems with these materials are:

(a) Nonspecific adsorption and elution

When immunoadsorbents are used for isolation of specific antibodies, the antibody purity achieved depends upon two major factors. The first is how much nonspecific protein previously adsorbed to the carrier from the serum is released with the antibody during the isolation procedure, while the second is the capacity the immunoadsorbent has for retention and release of antibody. For example, a 1 g. column of p-aminobenzylcellulose coupled to a protein antigen via azo linkage will release approximately 0.2 mg. of nonspecific protein/ml. of serum, passed through the column. Therefore, if the serum contains 1.0 mg. of specific antibodies per ml. the theoretical purity achievable is a maximum of 1.0 mg. antibody/1.2 mg. protein isolated, or 83.4%. However, if the 1.0 g. immunoadsorbent releases 0.01 mg. of nonspecific protein/ml. of serum passed through the column (1.0 mg. antibody/1.01 mg. protein isolated), then a 99% purity is theoretically possible. The other important factor is capacity. For example, the capacity of p-aminobenzylcellulose is approximately 100 mg. antibody/g. whereas that of carboxymethylcellulose is less than 15 mg./g.

(b) Flow-rates

Immunoadsorbents are generally employed in columns. Organic polymer carriers swell in alkaline solutions decreasing flow rates. In some instances, the flow rates are decreased to a point where the immunoadsorbent cannot be used. This is especially true with cellulose derivatives.

(c) Efficiency

Immunoadsorbent efficiency may be described as the percentage of antibody retained on the immunoadsorbent in relation to the total antibody added.

(d) Period of usefulness and yield

The number of times an immunoadsorbent preparation may be reused depends upon the percentage of complexed antibody that is released from the immunoadsorbent leaving sites available for reuse. This is referred to as yield. If the yield of complexed antibody is low, due to irreversible complexing, the material will have a short life span. Such materials also may arbitrarily fractionate the antibodies by releasing only a portion of the complexed antibodies. This problem is rather general with cellulose derivative and with polystyrenes. Recovery of antibodies from adsorbents of polystyrene range from 30% to 45%, while cellulose derivatives range approximately 25% for p-aminobenzylcellulose to a high of 78–100% for carboxymethylcellulose.

(e) Biological activity

The method of coupling antigens and antibodies to a carrier may cause denaturation and/or loss of biological activity.

Basically, the difficulties with insolubilized antibodies previously described in the literature have been low capacity, poor yield, limited reuse, and activity retention for only short periods of time unless freeze-dried. Therefore, the products prepared heretofore were economically unsatisfactory.

Quite surprisingly I have discovered a method of stabilizing antigens and antibodies by covalently coupling them to inorganic carriers. These immunochemical composites are biologically active, have acceptable capacity, excellent antigen-antibody association-dissociation characteristics, and can be reused over and over many times.

In accordance with the present invention, I have discovered an insolubilized immunochemical composite comprising a member selected from the group consisting of antigens and antibodies, coupled covalently to an inorganic carrier having available hydroxyl or oxide groups, the member being coupled to the carrier by means of an intermediate silane coupling agent wherein the silicon portion of the molecule is attached to the carrier and the organic portion of the molecule is attached to the member. I have also discovered a method of coupling the antigens or antibodies to the inorganic carrier through the intermediate silane coupling agent.

Antigens may be defined as substances that stimulate the formation of antibody within an animal and that can react observably with that antibody. Antigens generally possess a high molecular weight of 10,000 or greater. A hapten is a portion of an antigen or a simple chemical that cannot induce antibody formation, but that can react with an appropriate antibody. While the list below is not meant to be all inclusive (a detailed description is setforth in P. L. Carpenter, Immunology and Serology, 2nd Ed., 1968) typical antigens may be classified as follows:

(1) protein antigens, such as ceruloplasmin and serum albumin;
(2) bacterial antigens, such as teichoic acids, flagellar antigens, capsular polysaccharides, and extra cellular bacterial products and toxins;
(3) blood group antigens, such as glycoproteins and glycolipids;
(4) viruses, such as animal, plant and bacterial viruses;
(5) conjugated and synthetic antigens such as protein-hapten conjugates, and synthetic polypeptides;
(6) nucleic acids such as ribionucleic acid and deoxyribonucleic acid.

In response to an injection of antigens, the body of an animal produces specific antibodies which react with and neutralize the antigens. Antibodies are classified as proteins with the solubility of glubulins and the electrophoretic mobility of gamma-globulin. Their molecular weight falls principally into two groups of approximately 160,000 designated as normal globulins and 1,000,000 designated as macroglobulins. The low molecular weight type predominate in most animal species. Heavy antibody is produced in the horse, cow and pig immunized with pneumococci, and in rabbits immunized with sheep red blood cells. Human isohemagglutinins and various other antibodies are chiefly or entirely macroglobulins. The molecular weights of antibodies do not differ significantly from the molecular weights of globulins in normal sera of the various species. Of particular importance are the gammaglobulins which consist of a continuous series of proteins of different physical and chemical properties and overlapping biologic activities. They display wide variations in electrophoretic mobility, are salted out over a considerable range of electrolyte concentrations, yield many fractions by the alcohol precipitation method, and have sedimentation constants from 7S to 20S (Svedberg units).

The carriers are inorganic materials having available oxide or hydroxide groups. These materials must be substantially water insoluble and are either weak acids or weak bases. They may also be classified in terms of chemical composition as siliceous materials or non-siliceous metal oxides. Of the siliceous materials, a preferred carrier is porous glass either in particulate form or as an integral piece such as a disc. Glass has the advantage in that it is dimensionally stable and that it can be thoroughly cleaned to remove contaminants as for example by sterilization. Porous glass useful as a carrier is readily available and sold commercially by Corning Glass Works as Code 7930 porous glass. Such porous glass can be prepared having various pore dimensions in accordance with the teachings of Hood et al., U.S. Pat. No. 2,106,764, Chapman et al., U.S. patent application Ser. No. 565,372 now U.S. Pat. No. 3,485,687 and W. Haller, U.S. patent application Ser. No. 507,092 now U.S. Pat. No. 3,549,524. Other siliceous inorganic carriers which can also be used include colloidal silica, wollastonite, dried silica gel, and bentonite. Representative non-siliceous metal oxides include alumina, hydroxy apatite, and nickel oxide. These representative inorganic carriers may be classified as shown in the table below:

INORGANIC CARRIERS

| Siliceous | | Non-siliceous metal oxides | | |
|---|---|---|---|---|
| Amorphous | Crystalline | Transition MeO | Acid MeO | Base MeO |
| Glass | Bentonite | NiO | Al$_2$O$_3$ | Hydroxy. Apatite. |
| Silica gel | Wollastonite | | | |
| Colloidal silica | | | | |

The silane coupling agents are molecules which possess two different kinds of reactivity. These are organofunctional and silicon-functional silicon compounds characterized in that the silicon portion of the molecule has an affinity for inorganic materials such as glass and aluminum silicate, while the organic portion of the molecule is tailored to combine with many organics. The main function of the coupling agent is to provide a bond between the antigen or antibody (organic) and the carrier (inorganic). In theory, the variety of possible organofunctional silanes useful in this invention is limited only by the number of known organo-functional groups and the available sites on the antigen or antibody molecule for bonding. A multitude of different silane coupling agents can be used as illustrated by the general formula:

$$(Y'R')_n SiR_{4-n}$$

wherein Y' is a member selected from the group consisting of amino, carbonyl, carboxy, isocyano, diazo, isothiocyano, nitroso, sulfhydryl, halocarbonyl; R is a member selected from the group consisting of lower alkoxy, phenoxy, and halo; R' is a member selected from the group consisting of lower alkyl, lower alkylphenyl, and phenyl; and $n$ is an integer having a value of 1–3. As a further embodiment, useful silane coupling agents may be represented by the formula:

$$Y_n SiR_{4-n}$$

wherein Y is a member selected from the group consisting of amino, carbonyl, carboxy, hydroxyphenyl, and sulfhydryl; R is a member selected from the group consisting of lower alkoxy, phenoxy, and halo; and $n$ is an integer having a value of 1–3. However, most available coupling agents have the formula:

$$RCH_2CH_2CH_2-Si(OCH_3)_3$$

wherein R is a reactive organic group, tailored to match the reactivity of the system in which it is to be used. It is not necessary to itemize the possible reactions of all these products, since the reactions of the organofunctional group can be found in any good organic chemistry text book.

However, important types of bonding between the coupling agent and the antigen or antibody, as illustrated merely by their functional or reactive groups, may be set forth as follows:

TYPES OF BONDING

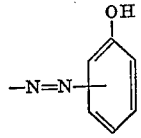

In one embodiment of the invention, the coupling agents are amino-functional aliphatic silanes such as N-beta-aminoethyl-gamma - aminopropyl - trimethoxysilane, N-beta-aminoethyl-(alpha-methyl - gamma - aminopropyl)-dimethoxymethylsilane, and gamma-aminopropyl-triethoxysilane. The coupling agent is applied to the glass substrate from a solvent solution. Only the higher boiling aromatic and aliphatic solvents have been shown to be useful. Particularly good solvents are toluene, benzene, xylene, and high boiling hydrocarbons. While the silane coupling agents are soluble in alcohol and water, these should be avoided because they interfere with good bonding. Also, aldehydes, ketones, acids, esters, or alkyl chlorides should be avoided as solvents because they tend to react with the silanes.

In order to select the optimum coupling agent or agents, it is important to consider the active sites and the susceptibility of the antibody molecule to denaturation. This does not generally apply to coupling of antigens. One must employ coupling techniques which do not destroy antibody activity. Thus the coupling methods for antibodies are limited. A coupling agent should be selected which is nondestructive to the antibody, as for example, by bonding to the tyrosine or sulfhydryl group of the antibody. Furthermore, the coupling agent must be such that bonding can be produced under conditions (e.g. temperature and pH) that they do not destroy either the antibody or the carrier. The conditions under which the bonded antibody is to be used is also significant in that the type of bond formed between the coupling agent and the antibody, which to a large extent depends on the selection of coupling agent, should be stable at those conditions. These necessary requirements also apply to a large extent to antigens.

The bonding of the antigen or antibody to the carrier is principally a two step reaction. Briefly, the first step involves bonding the coupling agent to the carrier and the second step involves bonding the antigen or antibody to the coupling agent-carrier combination. The quantity of antigen or antibody coupled appears to be dependent upon the surface are of the carrier available for reaction.

Considering my novel process in more detail, there is an initial cleaning procedure to remove contaminating materials, such as organic substances, from the surface of the carrier to leave the oxide or hydroxide groups available for bonding. The cleaning technique will to some extent depend upon the particular carrier being used. When porous glass is used, it may be cleaned with a dilute nitric acid solution, rinsed with distilled water, dried, and then heated at elevated temperatures at about 625° C. in an oxygen atmosphere.

In applying the silane coupling agent from a solvent solution, it is necessary to provide some means to react the silicon-functional portion of the molecule. This may be accomplished by heating the solution to temperatures of between about 60–140° C. In a preferred method of the present invention, the silane coupling agent is dissolved in toluene in concentrations of about 0.1–10.0% by weight. Then, the solution of the coupling agent is applied by treating the carrier with the solution at elevated temperatures preferably under refluxing conditions, e.g. the toluene solution boils at about 105° C. Refluxing may be from about 1–16 hours with four hours usually being quite effective.

The coupling agents have been broadly defined by the formulae above. In order to form some of the compounds, the organofunctional portion of the silane may be modified after the coupling agent has been attached to the carrier. While a number of silane coupling agents are commercially available, others can be formed by standard, well-known reactions. Thus, for example the diazo derivative can be prepared from γ-aminopropyltriethoxysilane, after bonding to the carrier, by reacting with p-nitrobenzoic acid, reducing the nitro group to the amine, and then diazotizing with nitrous acid. Again starting with the γ-amnopropyltriethoxysilane bonded to the carrier, the isothiocyanoalkylsilane derivative is prepared by reacting the amino-functional group with thiophosgene.

It is now that the antigen or antibody is reacted with the organofunctional portion of the silane coupling agent. The aqueous antigen or antibody solution is placed in contact with the treated carrier at a temperature of usually at or below room temperature. After remaining in contact with the treated carrier for about 1–72 hours, the antigen or antibody is bound to the carrier and any excess is remoxed. It is important that the pH of the solution be held within a range that the antigen or antibody does not become irreversibly denatured. Also, the coupling reaction between the silane and the antigen or antibody may require a certain pH range, e.g., azo linkage forms best between pH 8–9. Finally, the bonded antigen or antibody may be air dried, but not dessicated, and stored. Alternatively, the bound antigen or antibody may be stored in water or a buffered solution at room temperature or below.

My invention is further illustrated by the following examples:

Example I.—A sample of powdered porous 96% silica glass (350 A. ±50 A. pore size, less than 350 mesh) was washed in 0.2 N $HNO_3$ at 80° C. with continuous sonication for 3 hours. The glass was washed several times with distilled water by decantation and then heated to 625° C. overnight in the presence of $O_2$.

The glass was cooled and placed into a round bottomed flask. Ten grams of glass were added to 150 ml. of a 10% solution of γ-aminopropyltriethoxysilane in toluene. The mixture was refluxed overnight and washed with acetone. The reaction product (hereinafter referred to as aminoalkylsilane derivative) was air dried and stored.

Thereafter the aminoalkylsilane derivative was added to 100 ml. of 10% thiophosgene in chloroform and refluxed for several hours. The product was washed exhaustively in chloroform to remove the remaining thiophosgene. The isothiocyanoalkylsilane derivative was air dried and used immediately after synthesis for coupling.

Four grams of the isothiocyanoalkylsilane derivative were added to 15 ml. of $NaHCO_3$ solution, pH 9.0, containing 29 mg. of *Serratia marcescens* immunoglobulin. The reactants were stirred for two hours at room temperature and then exhaustively washed in distilled water. The product was stored in distilled water at 5° C. until use.

Ring slides were specially prepared for agglutination tests of *Serratia marcescens* with insolubilized immunogloubulin. To each of nine wells on the slide was added 0.05 ml. of increasing log dilutions of the organism ranging from $10^9$/ml. to $10^2$/ml. diluted in 0.01 M phosphate buffered saline, pH 7.0. To each sample of the organisms was added 0.05 ml. of the insolubilized antibody suspended at a concentration of 15.0 mg. to 17.0 mg. of glass/ml. in 1% NaCl solution. The reactants were rotated on a clinical rotator at 180 r.p.m. for 15 minutes, placed on a vibrator for 10 seconds and examined microscopically at 40×.

The results indicate that the minimum detactable number of organisms was approximately $5 \times 10^4$. Substituting saline or *Bacillus subtilis* for the *Serratia marcescens* or glass particles for the stabilized immunoglobulin particles resulted in no agglutination.

The experiment was repeated 15 days later employing fresh organisms but the same sensitized glass which had been stored at 5° C. The results were identical. Increasing reaction time did not increase sensitivity.

The aggultination reaction described involves the complexing of the bound antibody molecules to the bacterial cells. The bacteria act as a cross-linking agent allowing many particles to come together. When no bacteria (antigen) are present then the particles have no way of clumping or agglutinating. This experiment shows that the glass particles have been sensitized with specific antibodies and may be employed for detection of specific antigens.

Example II.—To 2 g. of the aminoalkylsilane derivative of porous glass (780 A.±50 A. pore soze), as prepared in Example I, was added 1 g. of p-nitrobenzoylchloride in chloroform and refluxed for 12 hours. The reacted material was washed exhaustively in chloroform, added to 500 ml. of distilled water containing 5.0 g. sodium dithionite and boiled for 30 minutes. The p-aminobenzoic acid amide of the aminoalkylsilane-glass (hereinafter referred to an aminoarylsilane derivative) was washed with distilled water, followed by acetone and air dried.

The aminoarylsilane derivative was diazotized in 0.1 N HCl by addition of an excess of solid $NaNO_2$ at 0° C. The product (hereinafter referred to as diazoarylsilane derivative) was added to 0.25 g. of human gamma-globulin (HGG). The reaction was continued at 5° C. overnight. Thereafter, the chemically coupled human gamma-globulin was washed in distilled water and stored at room temperature.

A column was prepared with 1 g. of HGG-glass and equilibrated in 1% NaCl solution. To the column was added 1.0 ml. of rabbit anti-HGG serum. The serum was passed through the column and washed out with 1% NaCl solution. The effluent was collected for antibody determination. The antibody complexed to the HGG-glass was eluted in 0.05 M glycine-HCl, pH 2.3 and collected for antibody determination.

Antibody concentration was determined by quantitative precipitation analysis as described by Kabat, Experimental Immunochemistry, 2nd Ed. (1961) employing cold 0.01 M borate buffered saline (BBS), pH 8.0, for washes. Total protein was determined by the method of Lowry et al., J. Biol. Chem., 193, 265 (1951). The quantity of protein covalently coupled to the immunoadsorbents ranged from 14 mg./g. glass to 18 mg./g. glass in all experiments regardless of coupling technique. Storage of either antigen or antibody preparations in excess of 90 days in 0.01 m. borate buffered saline, pH 8.0 did not effect activity.

The results of several antibody isolation experiments are given in Table 1.

TABLE 1.—ISOLATION OF RABBIT ANTI-HGG ON HGG-GLASS COMPOSITE

| Antibody added [a] (mg.) | Antibody in effluent (mg.) | Total antibody in eluate (mg.) | Column [b] efficiency (percent) | Antibody [c] purity (percent) | Antibody recovery from column (percent) |
|---|---|---|---|---|---|
| 5.78 | 0 | 5.78 | 100 | 93.5 | 100 |
| 5.78 | 0 | 4.90 | 100 | 98.5 | 83 |
| 5.78 | 0.91 | 4.80 | 84.5 | 87.5 | 99 |
| 11.56 | 5.36 | 5.58 | 53.6 | 94.5 | 90 |

[a] Antibody concentration in serum, effluent, and eluate were determined by quantitative precipitin analysis.
[b] Column efficiency represents percent of total antibody added which was complexed to the immunoadsorbent.
[c] Antibody purity, percent of protein recovered in acid eluate precipitable with specific antigen.

Efficiency ranged from 53.6% antibody retention at the highest loading to 100% antibody retention at the lowest loading. Antibody purity in all experiments exceeded 90%. A total of 5.78 mg. of antibody was eluted from the column when specific antiserum was employed. No lose of antigenicity in coupled antigen has been noted after several months storage at 4° C. in borate buffer, or dried at room temperature.

Example III.—Seven grams of the isothiocyanolakylsilane derivative as prepared in Example I were added to a 150 mg. sample of rabbit anti-HGG globulin and to a 150 mg. sample of rabbit anti-L-asparaginase previously prepared by ammonium sulfate precipitation. The reactants were adjusted to pH 9.0 with solid $NaHCO_3$ and $NaCO_3$ and allowed to react for 4 hours at room temperature. Then the reaction was continued overnight at 5° C. The final product was stored at 5° C. in 0.01 M borate buffered saline, pH 8.0 (BBS).

The antibody glass derivative was washed several times with 1% NaCl solution, 0.05 M glycine-HCl, pH 2.3 and 0.1 M phosphate buffer, pH 7.0 (PBS). Three grams of the washed preparation was added to 20 ml. of human gamma-globulin dissolved in 0.01 M PBS, pH 7.0, containing 4.2 mg. protein. The preparation was stirred at room temperature and sampled at 5, 10, and 15 minutes, after addition of the antigen. The samples were filtered and the protein remaining in solution determined spectrophotometrically at 280μ. The antigen was eluted with 0.05 M glycine-HCl, pH 2.3. The results are shown in Table 2 hereinbelow.

TABLE 2.—COMPLEXATION OF HGG TO ANTIBODY-GLASS COMPOSITE

| Time (min.) | Immunoadsorbent by batch technique | | |
|---|---|---|---|
| | $A_{280m\mu}$ | HGG absorbed (percent) [a] | Recovered (percent) [b] |
| 5 | 0.17 | 52 | 100 |
| 10 | 0.15 | 62 | 100 |
| 15 | 0.15 | 62 | 100 |

[a] Represents percent of added 4.2 mg. antigen specifically complexed to the immunochemical composite.
[b] Represents percent of complexed antigen released on dissociation with 0.05 M glycine-HCl, pH 2.3.

The same experiment was repeated employing glucose oxidase as a nonspecific antigen. No protein was adsorbed.

The immunochemical composite was stored for 40 days in 0.01 M borate buffered saline, pH 8.0 at 6° C. Two grams were poured into a column and washed with a 1% saline solution. To the column was added 0.60 mg. HGG in 3 ml. of saline solution. The effluent was recovered and quantitated. The results are given in Table 3.

TABLE 3.—ISOLATION OF HGG BY COLUMN TECHNIQUE ON ANTIBODY-GLASS COMPOSITE

| Antigen (mg.) | Antigen complexed to column (mg.) | Antigen eluted with acid (mg.) | Recovery [1] from column (percent) |
|---|---|---|---|
| 0.60 | 0.34 | 0.34 | 100 |
| 0.60 | 0.39 | 0.29 | 74 |
| 0.60 | 0.38 | 0.37 | 97.3 |
| 1.00 [2] | | | |

[1] Percentage of antigen complexed to the column recovered on elution.
[2] Non-specific protein passed through column. (Glucose oxidase).

A dissociation of 74–100% of the antigen-antibody complex was achieved. A solution of human gamma-gloublin-bovine serum albumin (1:1 w./w.) was prepared in 1% saline containing a total of 1 mg. protein/ml. A total of 1 ml. was passed through a 2 g. column. The column was washed out with 1% saline and eluated with glycine buffer.

The eluate was subjected to paper electrophoresis in barbital buffer, pH 8.6 at 200 volts for 2 hours. The results showed a slight trace of bovine serum albumin (BSA) was present in the eluate. However, elution of the protein from the paper, and spectrophotometric estimation indicated that at least 80% of the total protein isolated was HGG. The derivative was then stored at 6° C. in borate buffered saline. Sixty days later another separation experiment was carried out. In this experiment, to the 1 ml. solution of BSA was added 0.81 mg. of HGG $S^{35}$ previously prepared. The total mixture was employed on the column as previously described. The solutions were counted on Baird-Atomic gas flow proportional counter. The results shown in Table 4 are from these experiments.

TABLE 4.—SEPARATION OF BSA AND NGG-$S^{35}$ ON ANTIBODY-GLASS COMPOSITE

| Original antigen, c.p.m. | Total protein added, mg. | Effluent | | Eluate | |
|---|---|---|---|---|---|
| | | C.p.m. | Mg. | C.p.m. | Mg. |
| 13,010 | 9.81 | 3,119 | 8.0 | 7,335 | 1.43 |
| 13,010 | 9.81 | 3,098 | 7.9 | 7,350 | 1.50 |
| 13,010 | 9.81 | 3,352 | 8.4 | 7,350 | 1.45 |

These data suggest that approximately 0.62 mg. HGG complexed to the column. Of the HGG complexed, a total of 0.45 mg. could be eluted with acid, leaving 0.16 mg. remaining on the column. The initial HGG concentration added was 0.81 mg./10.81 mg. total protein or 7.5%. The final HGG concentration after elution from the column was approximately 32%, an increase of 4.4 fold.

For determination of maximum antigen capacity, the derivative previously stored 47 days in 0.01 M BBS, pH 8.0 at 4° C.–6° C. was tested. A 1% solution of HGG in saline was passed through the column until the HGG concentration leaving the column was equal to that entering the column. The excess HGG was washed out with saline and the column was eluted with glycine buffer. A total of 4.83 mg. HGG was received on the 2 g. column. This represents twice the capacity as determined by batch technique 47 days earlier as shown in Table 2, with the same preparation.

Example IV.—Following the procedure of Example III and using the isothiocyanoalkylsilane derivative, 62 mg. of anti-L-aspariginase (prepared from rabbit globulin) was reacted with 2 g. of isothiocyanoalkylsilane derivative. The unreacted globulin was recovered and the total protein determined spectrophotometrically. A total of 13 mg. globulin were coupled per gram of the porous glass carrier.

A 2 g. column of coupled anti-L-asparaginase was prepared and washed consecutively with 0.05 M glycine-HCl, pH 2.3, 0.1 M phosphate buffered saline, pH 7.0 and 1% NaCl solution. An asparaginase extract from E. coli was then passed through the column and the effluent collected. The column was washed with 1% NaCl until no U.V. adsorbing material was detectable in a 10 mm. flow through cell at 280 m$\mu$.

The L-asparaginase was eluted with the 0.05 M glycine buffer, pH 2.3 and immediately neutralized with dilute NaOH. The original extract, the effluent, and the eluate were assayed for enzyme activity. Protein concentration was determined by the method of Lowry et al., op. cit.

An increase in enzyme activity after one pass of crude extract through the column is shown in Table 5. Increased activity ranged from a 270% minimum to 726% maximum. This represents approximately 10% of the activity of the original immunizing antigen.

Immunologic studies showed that the antisera prepared with the L-asparaginase contained antibodies to at least three distinct antigens present in the E. coli extract, one major and two minor antigens. The major antigen was present in all antigen samples tested and most likely was the enzyme. The two minor antigens were just barely discernible in the immunizing antigen but strongly present in the extract and to a slightly lesser extent in the acid eluates.

The results observed with crude extract experiment of Sample 3 in Table 5 were obtained 50 days after the previous experiments, indicating the coupled antibodies are quite stable.

TABLE 5.—PURIFICATION OF L-ASPARAGINASE

| | Enzyme activity (units/mg.) | Total activity (units) | Protein concentration (mg./ml.) | Activity increase (percent) | Recovered activity (percent) |
|---|---|---|---|---|---|
| Sample: | | | | | |
| 1: | | | | | |
| Crude extract | 0.28 | 214 | 6.00 | | |
| Effluent | 0.20 | 175 | 4.50 | | 81.6 |
| Eluate | 2.00 | 13 | 0.32 | 726 | 6.1 |
| 2: | | | | | |
| Crude extract | 0.122 | 162 | 9.20 | | |
| Effluent | 0.08 | 65 | 3.80 | | 40 |
| Eluate | 0.32 | 7.5 | 0.50 | 270 | 5.0 |
| 3: | | | | | |
| Crude extract | 0.36 | 266 | 5.4 | | |
| Effluent | 0.22 | 230 | 5.3 | | 86.5 |
| Eluate | 2.50 | 30 | 0.30 | 700 | 11.3 |

I claim:

1. A method of isolating an antigen from a solution comprising the step of contacting the solution with a composite comprising an inorganic carrier covalently coupled by means of an intermediate silane coupling agent to an antibody which can complex with the antigen, said silane coupling agent having the formula $$(Y'R')_n SiR_{4-n}$$

wherein Y' is a member selected from the group consisting of amino, carbonyl, carboxy, isocyano, diazo, isothiocyano, nitroso, sulfhydryl, and halocarbonyl; R is a member selected from the group consisting of lower alkoxy, phenoxy, and halo; R' is a member selected from the group consisting of lower alkyl, lower alkylphenyl, and phenyl; and n is an integer having a value of 1–3.

2. The method of 1 which comprises the additional steps of recovering the composite from the solution and eluting the complexed antigen from the composite.

3. The method of claim 2 which comprises the additional step of air drying the eluted antigen.

4. The method of claim 1 wherein the antibody is coupled to the silane coupling agent by means of an isothiocyano linkage.

5. The method of claim 1 wherein the carrier used is a siliceous material.

6. The method of claim 5 wherein the siliceous material is amorphous and contains at least 50 mole percent silica.

7. The method of claim 6 wherein the carrier is colloidal silica.

8. The method of claim 6 wherein said siliceous material is porous glass.

9. The method of claim 5 wherein the siliceous material is crystalline.

10. The method of claim 9 wherein the siliceous material is bentonite.

11. The method of claim 1 wherein the carrier used is a non-siliceous metal oxide selected from the group consisting of NiO, $Al_2O_3$ and hydroxyapatite.

12. The method of claim 1 wherein the antigen to be isolated is Serratia marcescens and the composite used to isolate the antigen consists of Serratia marcescens immunoglobulin